Jan. 5, 1960    F. HENRY    2,919,502
MUTABLE FEMININE FACIAL STYLE DISPLAY MEANS
Filed Oct. 2, 1956    2 Sheets-Sheet 1
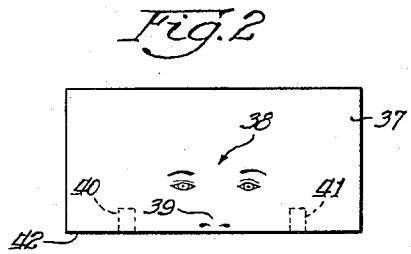
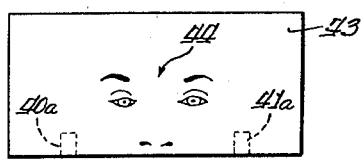
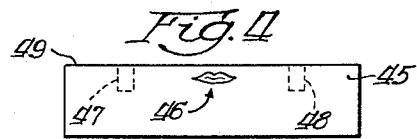
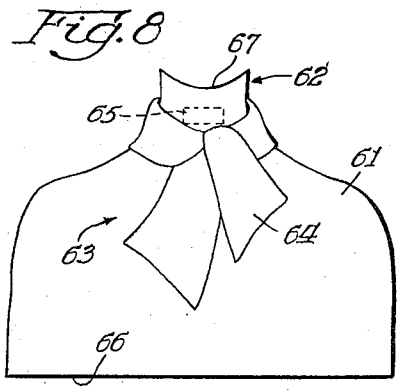
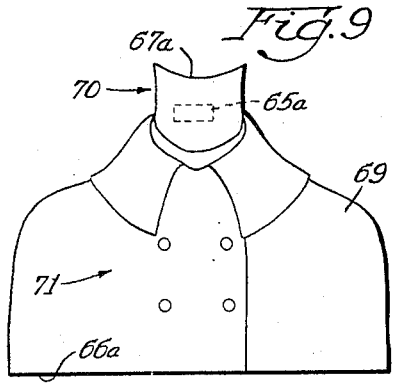
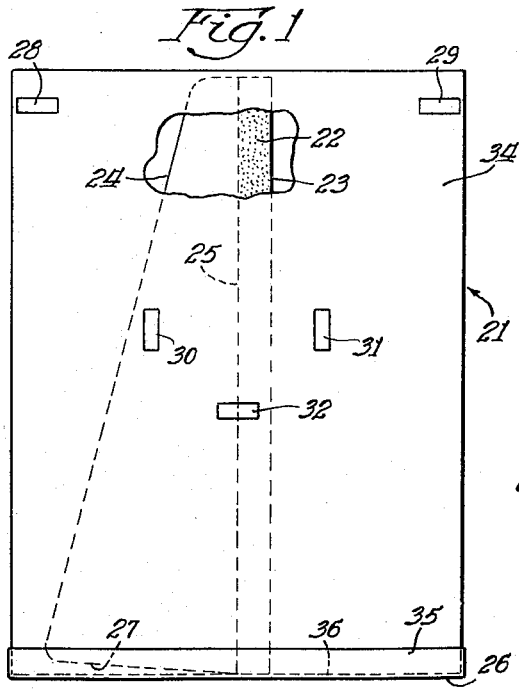
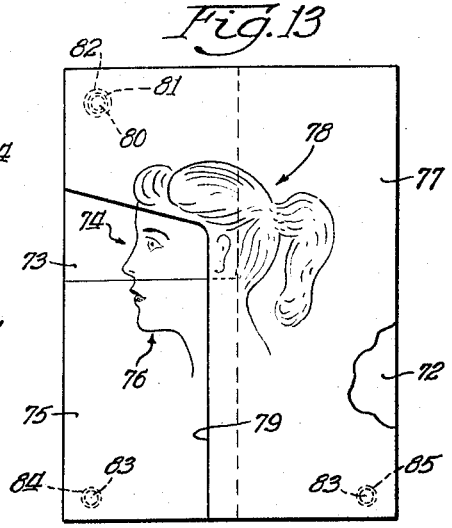
Inventor:
Frances Henry
By Jones, Darby & Robertson
Attys.

Jan. 5, 1960     F. HENRY     2,919,502
MUTABLE FEMININE FACIAL STYLE DISPLAY MEANS
Filed Oct. 2, 1956     2 Sheets-Sheet 2
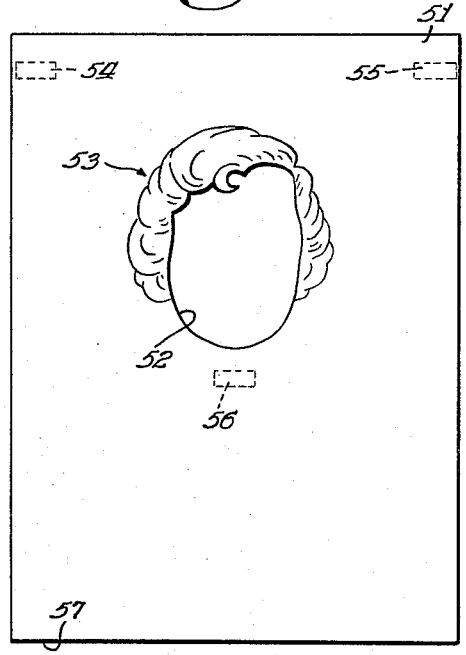
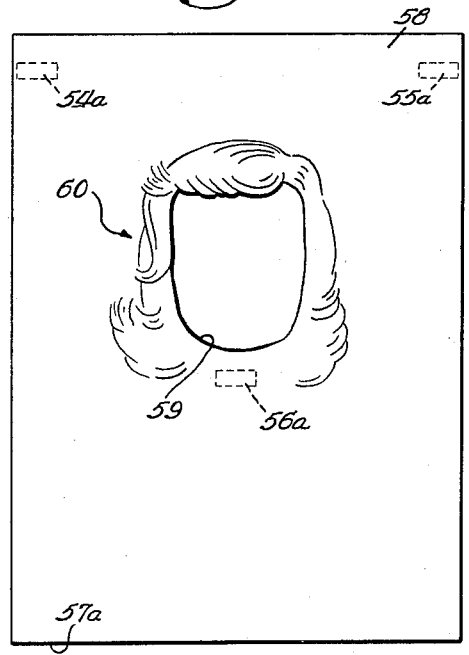
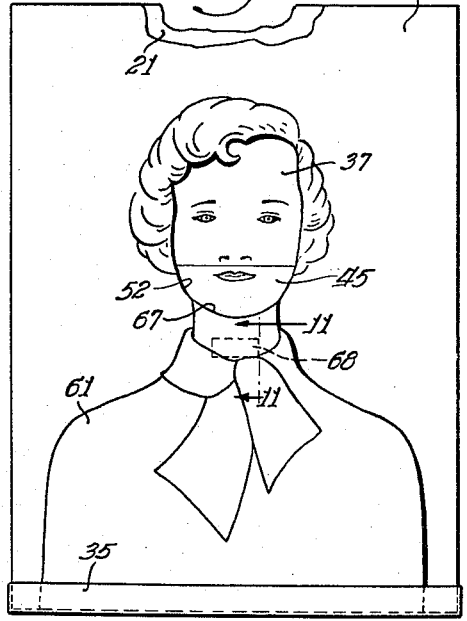
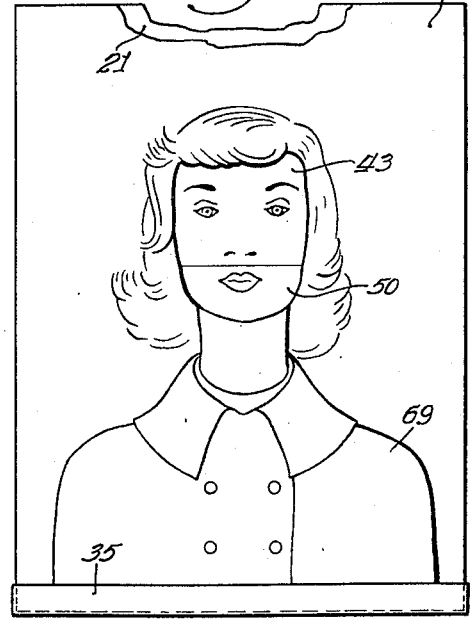
Inventor:
Frances Henry
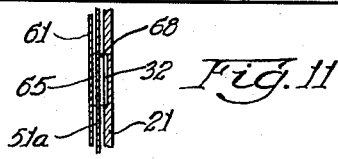

United States Patent Office 2,919,502
Patented Jan. 5, 1960

2,919,502

MUTABLE FEMININE FACIAL STYLE DISPLAY MEANS

Frances Henry, Chicago, Ill., assignor to William C. Henry, Norwalk, Ohio

Application October 2, 1956, Serial No. 613,453

3 Claims. (Cl. 35—59)

This invention relates to mutable style display means and is of particular utility for use of young girl students in high schools, for example, for experimenting, preferably under instructional guidance, with different combinations of feminine appearances comprising eye make-ups, lip make-ups, facial contours, hair-dos and neck or collar lines, with further variations, if desired, for the purpose of developing good taste in personal appearance by means of harmonious and esthetic arrangements, whereby the young girl can learn to put her particular facial characteristics in the best light by providing for her a visual graphic illustration of the undesirable visual effects of certain inharmonious or unesthetic combinations, and, on the other hand, of the more pleasing visual effects of other combinations.

The invention also is adaptable as a visual aid for the use of speakers before women's groups or other interested groups on subjects of adapting styles to personalities, by illustrating various possible mutations thereof.

These and other objects will be apparent, and the invention will be understood, by reference to the following detailed description, taken together with the accompanying drawings, of illustrative embodiments of the invention and in which drawings—

Figure 1 shows a base card or sheet provided with an expedient whereby it may be used as an easel if desired;

Figure 2 is illustrative of a first superposable sheet carrying a delineation of eyes;

Figure 3 is an illustration of another first superposable sheet having a different delineation of eyes;

Figure 4 is an illustration of a second superposable sheet carrying a delineation of lips;

Figure 5 is an illustration of another second superposable sheet carrying a different delineation of lips;

Figure 6 shows an illustration of a third superposable sheet carrying a delineation of hair-do and a cutout thereof illustrating a facial contour;

Figure 7 is an illustration of another third superposable sheet showing a different delineation of hair-do and cutout;

Figure 8 is an illustration of a fourth superposable sheet showing a delineation of neckline and bust;

Figure 9 is an illustration of a different fourth superposable sheet showing a different delineation of neckline and bust;

Figure 10 shows a composite view including the base sheet and superposable sheets of one possible combination;

Figure 11 is a fragmentary cross-section taken on the line 11—11 of Fig. 10;

Figure 12 is another composite view showing the base sheet and a different combination of superposable sheets; and Figure 13 shows the adaptation of the invention to a profile delineation, the previous figures depicting full face views.

Referring in detail to the illustrative construction shown in the drawings, the numeral 21 shows the base card or sheet which may be conveniently made of cardboard or the like and may be of any suitable size capable of being handled, but, preferably, in one embodiment, of a size of about 9 by 12 inches, the longer dimension running vertically thereof. For use in easel fashion the base 21 may have glued thereto as at 22, vertically centrally thereof, one hinge part 23 of a flap 24 that is bendable from the hinge part 23, on, say, a scored line 25, so that the flap 24 may either lie in a plane parallel with the base 21 or may be bent outwardly at right angles therefrom as a support for standing the base 21 uprightly on a table or the like with the lower edge 26 of the base being on the table and also the lower edge 27 of the flap 24, the latter being tapered upwardly slightly to effect a slight rearward inclination for the base 21 in the manner of an easel.

Means are shown carried by the base sheet 21 for readily removably attaching thereto the superposable sheets later more specifically referred to, embodiments of such means being shown as relatively small magnets, in this instance 28, 29, 30, 31, and 32. These magnets are in this instance in the shape of flat rectangular metallic pieces of ferro-magnetic material or the like, such as sintered alnico, capable of functioning as permanent magnets and are available on the market in such form so that they need not be further described. They may be embedded in the plies of the cardboard base sheet 21, and, in any case, are flush with the upper or forward surface 34 of the base 21.

As here shown, magnet 28 is in the upper left-hand corner of the base sheet and magnet 29 in the upper right-hand corner, these being disposed horizontally in horizontally aligned relationship. Magnets 30 and 31 are arranged in vertically disposed parallel spaced apart relationship adjacent the middle region of the base sheet, just slightly above center. Magnet 32 is horizontally disposed between and below the magnets 30 and 31 and just below center of the base sheet. Instead of the elongated rectangular magnets here shown, small circular permanent magnets similarly available on the market, may be used, and if desired two of the latter may be arranged side by side to produce an elongated effect.

Additional means, which may or may not be employed, are here shown for supporting the superposable sheets, or some of them, on the base sheet 21, such as the overstrip 35 along the bottom of the base sheet arranged to provide a pocket 36 into which the lower edge of a superposable sheet may be inserted.

Further in accordance with the present invention, and turning to Fig. 2, this shows one of the first superposable sheets 37 having thereon a delineation of eyes or eye make-up 38. The sheet 37 also preferably carries a suggestion of nostrils 39. On the back of the sheet 37 at horizontally spaced apart places on its lower margin are two metallic pieces 40 and 41 such as of tin or the like, capable of being magnetically attracted by the magnets 30 and 31 respectively and which may be attached to the sheet 37 by any suitable means such as gummed tape. The metallic pieces 40 and 41 are slightly shorter than the magnets 30 and 31 of the base 21. When the sheet 37 is superposed on the base 21, the metallic pieces 40 and 41, being spaced apart to register with the magnets 30 and 31, may be attached to the latter so that the lower edge 42 of the sheet 37 is desirably located to bisect the magnets 30 and 31. This leaves the lower halves of the latter still exposed while the metallic pieces 40 and 41 are attached to the upper halves of the magnets 30 and 31 respectively. The sheet 37 is thus located just above center on the backing 21 and attached to the base 21 so that the base may be placed upright as in easel fashion and the sheet 37 will not fall off.

Figure 3, showing another first superposable sheet 43 having the metallic pieces 40a and 41a adjacent its lower edge similar to the metallic pieces 40 and 41 of the sheet 37, has a different delineation of eyes or eye make-up 44 thereon but is otherwise identical with the sheet 37 and may be placed on the base 21 in exactly the same way as the sheet 37 and in substitution therefor. It will be understood that the sheet 43 is representative of a number of other such sheets which can be provided in accordance with the present invention, having different delineations of eyes, or eye make-ups, thereon respectively.

As shown in Figure 4, a second superposable sheet 45 has thereon the delineation of lips or lip make-up 46. The sheet 45 has a pair of metallic pieces 47 and 48 spaced horizontally apart on its upper margin, and these are arranged to register with the lower halves of the magnets 30 and 31 respectively, the upper edge 49 of sheet 45 coinciding with the lower edge 42 of the sheet 37, just below center of the base 21 and held thereto by magnetism. The base is thus supplied with the delineation of a pair of eyes, nostrils, and lips, generally centrally thereof.

Figure 5 showing another second superposable sheet 50 has a different delineation of lips or lip make-up 50a thereon, but is otherwise similar to the superposable sheet 45, having the metallic pieces 47a and 48a adjacent its upper edge 49a in duplication of the similar parts 47, 48 and 49 of the sheet 45 and useable in the same way, the sheet 50 being representative of a large number of other such sheets which could be provided having different delineations of lips thereon.

Sheets 45 and 50 are desirably short enough vertically so as, when located on base 21 as described, to leave magnet 32 exposed.

Next, still following the present invention, Fig. 6 shows a third superposable sheet 51, in this instance advantageously of the same area as the base 21, and having, just above center, a cutout or aperture 52 illustrating a facial contour, around the upper part of which is shown the delineation 53 of hair and illustrating a style of feminine hair-do. On the back of the sheet 51 adjacent its upper left-hand and right-hand corners are pieces of metal 54 and 55 adapted to register respectively with the magnets 28 and 29 on the base 21. Also on the back of the sheet 51, just below center, is another metallic piece 56 adapted to register with the magnet 32 on the base. If the pocket 35—36 shown in Fig. 1 is used, the lower margin of the superposable sheet 51 may be slipped into the pocket 36 for additional securement of the sheet 51 to the backing with its lower edge 57 in register with the lower edge 26 of the base 21.

Figure 7 shows another third superposable sheet 58 which may be employed in substitution of sheet 51 and that has therein a cutout or aperture 59 showing a different facial contour than the opening 52 and having the delineation of a different hair-do 60 about the aperture 59. The sheet 58 is provided on its back with the metallic pieces 54a, 55a and 56a which function respectively as do the pieces 54, 55 and 56 of the sheet 51. Also for additional securement the lower edge 57a of the sheet 58 may be slipped into the pocket 35—36 of the base 21 similarly to the lower edge 57 of the sheet 51. It will be understood that sheet 58 is representative of a great number of other sheets which may be provided in accordance with the present invention illustrating different styles of hair-do with the same or a different facial contour, just as the variations of the sheet 51 may be provided as showing the hair-do 53 with other facial contours than the contour 52, or with the same facial contour but different styles of hair-do.

The expedients so far specifically described, that is the combination of the base 21 with either of the sheets 37 or 43, and with either of the sheets 45 or 50, and with either of the sheets 51 or 58, are of utility for the purpose herein set forth in its essentials, but the purposes hereof may be more fully realized by the addition of at least one other superposable sheet such as is shown in Fig. 8, namely the fourth superposable sheet 61 portraying a neck-line 62 and a bust and collar line 63. The neck 62 is shown of relatively short length and the collar line 63 includes a scarf 64. On the back of the superposable sheet 61, just below its upper edge, is a metallic piece 65 that is adapted to register with the magnet 32 as is the metallic piece 56 of the sheet 51 or the metallic piece 56a of the sheet 58, since the magnet 32 may be of sufficient strength to attract the metallic piece 65 through the sheet 51 for example. Furthermore, for additional securement of the sheet 61 to the base 21 the sheet 61 is shown of a size such that its lower edge 66 is received in the flap pocket 35—36 with the edge 66 in register with the base edge 26, the retuse curve 67 at the upper edge of the neck 62 coinciding with the chin line of the facial contour aperture 52 of the sheet 51 for example as shown in Fig. 10. It will be understood that the sheet 61 is representative of different such sheets which may be provided in accordance with the present invention each displaying for example a different neck or collar line in combination with the neck 62.

Figs. 10 and 11 also show a modification that may be employed if additional magnetic force be desired, as, for example to hold the chin line 67 in close coincidence with the chin line of the aperture 52, such as the location of an additional permanent magnet 68 on the back of the sheet 51a, which may be used in place of the sheet 51, that is by substituting the permanent magnet 68 of the sheet 51a in place for example of the metallic piece 56 of the sheet 51. Thus as shown in Fig. 11 the metallic piece 65 of the sheet 61 will then be attracted by the magnet 68 as well as by the magnet 32, thus enhancing the magnetic force. The magnets 68 and 32 are oriented so as to place their respective poles in proper position for mutual attraction rather than repulsion as is well known in the art.

Reverting to Fig. 9, this shows other fourth superposable sheets 69 that show a different neck 70, in this instance a relatively long neck, and a different neck line and bust 71, the sheet 69 being otherwise similar to the sheet 61 and having the metallic piece 65a on the back of the neck part that functions like the metallic piece 65 of the sheet 61, and also having the lower edge 66a that may be slipped into the pocket 35—36, and also having the retuse curve 67a. The sheet 69 is representative of a great number of different combinations of necks and neck lines including busts, which may be provided in accordance with the present invention.

As seen in Fig. 12, the composite appearance there shown is produced by combining with the base 21 and the sheet 43 of Fig. 3, for the eyes, sheet 50 of Fig. 5 for the lips, sheet 58 for the facial contour and hair-do and sheet 69 of Fig. 9 for the neck and neck line or bust.

It will be understood that the delineations of Figs. 10 and 12 are selective of their respective superposable sheets and representative of practically innumerable combinations or mutations that can be experimented with by the user of the present means. For example the sheet 51 could be tried with the eyes 43 and lips 50 in place of the eyes 38 and lips 46, or with either of these in substitution of what is shown in Fig. 10. Also the sheet 69 may be used with the sheet 51 instead of the sheet 61 as shown in Fig. 10. Or the sheet 61 could be used with the sheet 58 instead of the sheet 69 as shown in Fig. 12, and the sheets 37 and 45 instead of the sheets 43 and 50 could be used with the sheet 58.

It is to be understood that the magnets are representative of readily releasable means that may be employed for attaching the superposable sheets to the base sheet or to each other.

Adaptation of features of the invention to profiles is illustrated in Fig. 13. As there shown, the base sheet 72 has superimposed thereon in its upper left-hand corner a sheet 73 having the delineations of the profile 74 of an eye and nose, then below that in the same plane, the sheet 75 having the delineation of profile 76 of a mouth and chin, and then offset over those is superposed the sheet 77 having the delineation of the profile 78 of a head and hairdo. The sheet 77 is shown having a cutout 79 that permits the sheets 73 and 75 to be seen therethrough. For releasable attachment of the superposable sheets 73 and 77 to the base 72, the latter may be supplied with a magnet 80, the sheet 73 with metallic piece 81 and the sheet 77 with metallic piece 82 in registering location in the upper left-hand corners of the sheets, the magnet and the metallic pieces in this instance being shown round. Furthermore, the backing sheet 72 may have the magnet 83 at each lower corner and the sheet 73 may have the metal piece 84 to register with one of the magnets 83 and the sheet 77 may have the metal piece 85 to register with the other magnet 83.

Where the term "eyes" is used here it is intended generally to include a delineation of brow and nostrils, and where the term facial contour is used it is intended generally to include the hair-do. Also where the term neck is used it is generally intended to include a neck line and bust.

Sheets 37 and 45 for example are representative of a pair of sheets arranged co-planar, the upper one 37 carrying the delineation of eyes and nostril and the lower one 45 the delineation of lips, and sheet 51 (or 51a) is representative of a sheet superposed over sheets 37, 45 carrying the delineation of hair and having a cutout 52 through which sheets 37, 45 are seen; similarly with respect to sheets 73, 75, and sheet 77 with its cut-out 79.

Manifestly the invention is not intended to be limited to details shown for purposes of illustration and such changes, including modifications and additions, are contemplated, as fall within the scope of the appended claims.

What is here claimed is:

1. Mutable means for studying feminine facial style effects, comprising, a base, a plurality of display means of limited area selectively superposable on said base, each display means providing a delineation of eyes, eyebrows, nose and lips, without other delineation and without hairline, the delineations on one of said display means being different from the delineations on others of the display means, a plurality of cut-out sheets selectively superposable on said base covering the outer margins of said display means for displaying said delineations therethrough in normal relation to the cut-out, said cut-out sheets carrying delineations of a facial contour and a hair-do, each said cut-out being defined by a continuous closed-line edge outlining a face including a hairline, the face outline and hair-do of one cut-out being different from the face outline and hair-do of others of the cut-outs, whereby varied selections of one of the plurality of said display means and one of the plurality of said cut-out sheets visual variations may be portrayed for studying mutations of style effects.

2. In mutable feminine facial style display means, a base sheet, a plurality of first sheets of limited area selectively superposable somewhat centrally on said base sheet, each first sheet bearing a delineation of eyes, eyebrows, and nose, the delineation on each sheet of said first sheets being different from the delineations on others of said first sheets, a plurality of second sheets of limited area selectively superposable on said base sheet somewhat centrally below a first sheet, the lower edge of the first sheet coinciding with the upper edge of the second sheet, each second sheet carrying a delineation of lips, the delineation on each of said second sheets being different from the delineations on others of said second sheets, said first and second sheets being without other delineation and without hairline, a plurality of third sheets each having a continuous closed line cut-out therein selectively superposable on said base sheet to cover the margins of a first and a second sheet except along said edges where said delineations appear, each of said third sheets carrying a delineation of a facial contour and a hair-do, the delineation on each said third sheet being different from the delineations on others of said third sheets, said facial contour being defined by the cut-out of a third sheet for displaying a first sheet delineation and a second sheet delineation therethrough in normal relation to the facial contour whereby by varied selections of one of each of said first, second and third sheets visual variations may be displayed in different combinations of eyes, lips, facial contours and hair-dos for studying mutations thereof to achieve the most pleasing style effect for the same and different faces, and means holding the superposable sheets on the base sheet.

3. The combination with the mutable means of claim 2 of a plurality of fourth selectively superposable sheets, each fourth sheet bearing a delineation of a neckline superposable on one of said third sheets, the delineation on one of said fourth sheets being different from the delineation on others of said fourth sheets.

References Cited in the file of this patent
UNITED STATES PATENTS

| | | |
|---|---|---|
| 408,148 | Throop | July 30, 1889 |
| 1,155,523 | Smith | Oct. 5, 1915 |
| 1,516,264 | Bliss | Nov. 18, 1924 |
| 2,071,338 | Henze | Feb. 23, 1937 |
| 2,331,776 | Heggedal | Oct. 12, 1943 |
| 2,363,914 | Wakefield | Nov. 28, 1944 |
| 2,465,971 | Leblang | Mar. 29, 1949 |

FOREIGN PATENTS

| | | |
|---|---|---|
| 384,919 | Great Britain | Dec. 15 1932 |